(12) United States Patent
Giacchi et al.

(10) Patent No.: US 8,714,075 B2
(45) Date of Patent: May 6, 2014

(54) AEROSTATIC BEARING AND METHOD FOR PRODUCTION THEREOF

(75) Inventors: Marco Giacchi, Waldstetten (DE); Ulrich Graf, Bietigheim-Bissingen (DE); Christian Mayershofer, Gundremmingen (DE); Jörn Ostrinsky, Gerlingen (DE); Jan-Grigor Schubert, Pulheim (DE); Andreas Wolf, Stuttgart (DE)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 1028 days.

(21) Appl. No.: 12/742,693

(22) PCT Filed: Oct. 31, 2008

(86) PCT No.: PCT/EP2008/064761
§ 371 (c)(1),
(2), (4) Date: May 13, 2010

(87) PCT Pub. No.: WO2009/062851
PCT Pub. Date: May 22, 2009

(65) Prior Publication Data
US 2010/0247308 A1    Sep. 30, 2010

(30) Foreign Application Priority Data

Nov. 14, 2007  (DE) .......................... 10 2007 054 334

(51) Int. Cl.
*F16J 10/04*    (2006.01)

(52) U.S. Cl.
USPC ....................................... 92/169.1; 92/DIG. 2

(58) Field of Classification Search
USPC .................... 92/169.1, 171.1, DIG. 2; 384/12
See application file for complete search history.

(56) References Cited

U.S. PATENT DOCUMENTS

| | | | |
|---|---|---|---|
| 5,106,204 A * | 4/1992 | Dunham | .......................... 384/12 |
| 5,645,354 A | 7/1997 | Heinzl et al. | |
| 2006/0147130 A1 | 7/2006 | Ruijl | |
| 2009/0238701 A1 * | 9/2009 | Giacchi et al. | ................. 417/321 |

FOREIGN PATENT DOCUMENTS

| | | |
|---|---|---|
| DE | 841381 | 6/1952 |
| DE | 102006009268 A1 | 8/2007 |
| WO | WO 2006069881 A1 * | 7/2006 |

* cited by examiner

*Primary Examiner* — Michael Leslie
(74) *Attorney, Agent, or Firm* — Nixon & Vanderhye, P.C.

(57) ABSTRACT

An aerostatic bearing and a linear compressor that includes the aerostatic bearing. In an exemplary embodiment, the aerostatic bearing includes a guide element including holes, and a body structured to move along a surface of the guide element. The holes may include a first section close to the body, of which at least one part area features a cross-sectional surface substantially constant over its entire length which is smaller towards the body than another cross-sectional surface of an area away from the body. A method for producing a hole in an element, using a laser beam, for producing the aerostatic bearing is also disclosed.

18 Claims, 2 Drawing Sheets

AEROSTATIC BEARING AND METHOD FOR PRODUCTION THEREOF

BACKGROUND OF THE INVENTION

The present invention relates to an aerostatic bearing and to a method for producing micro holes which is especially applicable to the production of the aerostatic bearing.

Aerostatic bearings are based on air or another gas being blown in between two bearing bodies. The resulting dynamic pressure means that a gap is produced between the two bearing bodies, i.e. direct contact between the bearing bodies is avoided. It is thus possible to carry out relative movements between the bearing bodies with low frictional forces and thereby to realize a low-wear bearing with high efficiency. A supply channel for feeding the air or another gas into the bearing gap runs through one of the two bearing bodies, referred to below as the guide element. To maintain the gas cushion between the bearing bodies work must continuously be done. To keep the gas consumption—and thereby the energy consumption—of the bearing low or to achieve a high bearing force of the bearing, this supply is generally designed so that nozzles of the supply channel in a surface of the guide element facing towards the other bearing body, referred to below as the bearing surface, are arranged facing one another and represent the narrowest point of the supply.

An aerostatic bearing is known from DE 44 36 156 C1, of which the nozzles are micro holes created by laser radiation. The micro holes have a conical cross section, with the narrowest cross section of the nozzles lying directly adjacent to the bearing surface. Because of the conical cross-sectional shape the amount of material to be removed to produce the micro holes does not increase linearly with the width of the guide element but in a power-of-three relationship. Accordingly the processing time required for creating the micro holes also increases to the power of three of the width. The method is thus essentially only able to be used cost effectively for small widths of the guide element. Accordingly the figures of DE 44 36 156 C1 show wall widths which approximately correspond to the hole diameter.

A further problem of the conical hole shape is that, with a bearing under a heavy load, the bearing plate has have a high wall thickness to be sufficiently stable in shape. To safely avoid the bearing bodies coming into contact however, a high density of nozzles is simultaneously needed, which, as a result of their conical form, greatly weaken the bearing plate or restrict the maximum wall width able to be realized.

A further disadvantage of an aerostatic bearing with the conical nozzle geometry known from DE 44 36 156 C1 emerges from the fact that the gas throughput through a nozzle is uniquely defined by the pressure difference present at the nozzle and by the nozzle cross section. A minimum outlet cross section of the nozzle is predetermined by the parameters of the laser beam used for drilling the hole. If the position and the number of nozzles is also predetermined in the design of the bearing, this results in a gas consumption of the bearing which can no longer be exceeded during operation and which predetermines an upper limit for the efficiency of a linear compressor able to be realized with the aerostatic bearing.

BRIEF SUMMARY OF THE INVENTION

The object of the invention is to specify an aerostatic bearing which is both mechanically robust and also able to be produced cost effectively within a short time. A further object is to specify a method for creating holes, especially in a guide element of such an aerostatic bearing.

The first object is achieved, for an aerostatic bearing with a guide element provided with holes and a body able to be moved along a surface of the guide element, by the holes having a first section close to the body, of which at least a part area features a cross section essentially constant over its length which is smaller towards the movable body than a cross-sectional surface of an area away from the body. The resistance which such a hole presents to a gas flowing through it is essentially determined by the length of the first section. By this length being varied as required, different gas consumption rates are able to be realized for a predetermined position and number of nozzles in the guide element. The amount of material to be removed essentially only increases linearly with the thickness of the guide element, so that the holes can be produced within an acceptable space of time even in a thick guide element. Since the hole diameter on a surface facing away from the movable body, i.e. in the area away from the body, does not increase with the thickness of the guide element, there is no danger, even with a thick guide element, of adjacent holes intersecting with each other and weakening the guide element unacceptably.

The guide element can be planar and allow a gas-supported movement of the body in two degrees of freedom; preferably however it guides the body in a linear manner with a single degree of freedom and surrounds it in a section transverse to the guide direction. Preferably the guide element is in the shape of a cylindrical tube.

Preferably the hole includes a second section away from the body with a second cross-sectional surface which is larger than the cross-sectional surface of the first section.

The cross-sectional surfaces of the two sections are preferably essentially constant over their entire length.

The first section preferably has a diameter ranging from 10 to 40 µm. The diameter of the second section is preferably at least twice as big.

Because of the different diameters of the first and second section the hole can expediently feature in the transition area from the first to the second section a third section which can typically run at an angle. These angled sections lead to an essentially a conical third section and form a continuous transition between the first and the second section (see FIG. 2). The fact that the cross-sectional surface continuously increases from the first to the second section results in a laminar gas flow being achieved without unnecessary turbulence when guided into the first section.

The third section can however also be embodied as a step or jump if the first and the second section essentially directly adjoin each other or meet.

For the two variants described previously it is true to say that the first section of the holes close to the body, i.e. the section facing towards the surface guiding the body, has a cross-sectional surface which is larger than the cross-sectional surface of the second section away from the body, i.e. the section facing away from the surface guiding the body.

The guide element preferably has a width of at least 0.5 mm but can also amount to 1 mm or more.

In accordance with a preferred form of embodiment a linear compressor for compressing coolants is provided with an aerostatic bearing in accordance with the forms of embodiment given above.

Preferably the body forms a piston and the guide element a cylinder wall of this linear compressor.

In addition a refrigeration device and especially a refrigerator and/or freezer is provided, which includes the above-mentioned linear compressor. This typical use is not to be viewed as restrictive but instead simply to specify a possible application.

It is however also conceivable to provide the inventive aerostatic bearing in any other suitable device which will not be mentioned explicitly here.

The second object is achieved by a method for producing a hole in an element, especially in a guide element of an aerostatic bearing as described above, by using a laser beam in which, for drilling a first section of the hole, a lower laser beam power and/or a smaller laser beam pulse energy is used than for drilling a second section which has a larger cross section than the first. This makes it possible to drill the first and the second section with the speed of advance approximately the same despite different amounts of material to be removed per length unit of the hole. Thus the time required for creating a hole is essentially dependent in only a linear manner on the thickness of the element.

The laser beam power employed for drilling the second section and/or laser beam pulse energy preferably amounts to a least twice the laser beam power and/or laser beam pulse energy used for drilling the first section.

Preferably an identical laser is used for drilling the first and the second section. This removes the necessity to align two laser beams onto the location of an identical hole and the working times required for creating the holes can be further reduced.

For the same reason the first and the second section are expediently drilled from a same side of the element. The larger-cross-section second section is expediently drilled before the first section.

The laser beam is preferably focused on a surface of the element facing away from its source in order to be able to create the narrow first section of the hole in the vicinity of this surface.

If the pulse energy and/or power of the laser beam is gradually reduced after the drilling of the second section, a third hole section can be obtained at the base of the first hole section which narrows as it becomes deeper, which can later be adjoined by the first section.

In order to take away material removed during the drilling of the element and in order if necessary to protect optics guiding the laser beam from contamination by the removed material, a gas flow is preferably directed during the drilling against the surface of the plate.

BRIEF DESCRIPTION OF THE DRAWINGS

Further features and advantages of the invention emerge from the description given below of exemplary embodiments which refer to the enclosed figures. The figures show:
a.

DETAILED DESCRIPTION OF EXEMPLARY EMBODIMENTS OF THE PRESENT INVENTION

Figure 1:
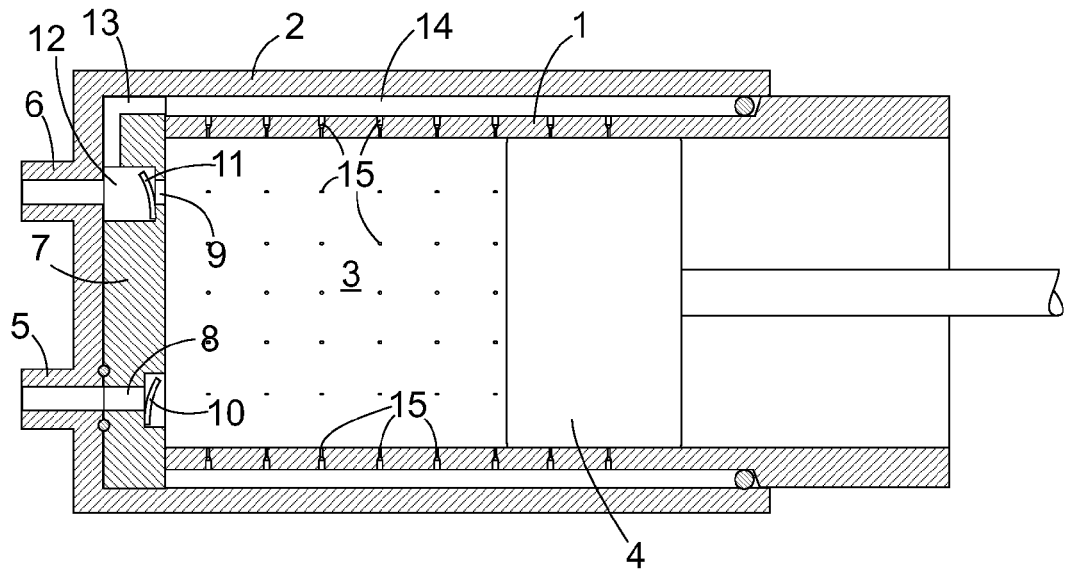
FIG. 1 a schematic section through an aerostatic bearing;
b.

The aerostatic bearing shown in an axial section in FIG. 1 comprises a cylindrical tube section 1 and a cup 2 turned in around one end of the tubular section 1, which together delimit a compressor chamber 3 of a linear compressor, and a piston 4 able to be moved backwards and forwards in the tubular section 1. At the base of the cup are located an inlet connection piece 5 and an outlet connection piece 6. A valve plate 7 within the cup 2 forms an end face side of the compressor chamber 3. The valve plate 7 has holes 8, 9 lining up with the connection pieces 5, 6 which each accommodate a non-return valve 10, 11. The non-return valves 10, 11 are each formed by elastic tongues which in the relaxed state rest against a valve seat formed by a shoulder of the hole 8 or 9 respectively; other designs of non-return valve are also considered.

From a chamber 12 arranged between the non-return valve 11 and the outlet connection 6 of the hole a connection line 13 extends to an annular hollow space 14 of which the inner wall is formed by the tube section 1 and its outer wall by the cup 2. The hollow space 14 communicates with the compressor chamber 3 via a plurality of holes 15 extending radially through the wall of the tubular section 1.

When the compressor is in operation and the piston 4 is moving backwards and forwards in the compressor chamber 3, it generates an overpressure in the chamber 12 which propagates via the connecting line 13 into the hollow space 14. A pressure difference between the hollow space 14 and the compressor chamber 3 drives a flow of the compressed gas through the holes 15, which generates a gas cushion between the inner side of the tube section 1 and the piston 4 and thus makes possible a non-contact movement of the piston 4.

Figure 2:
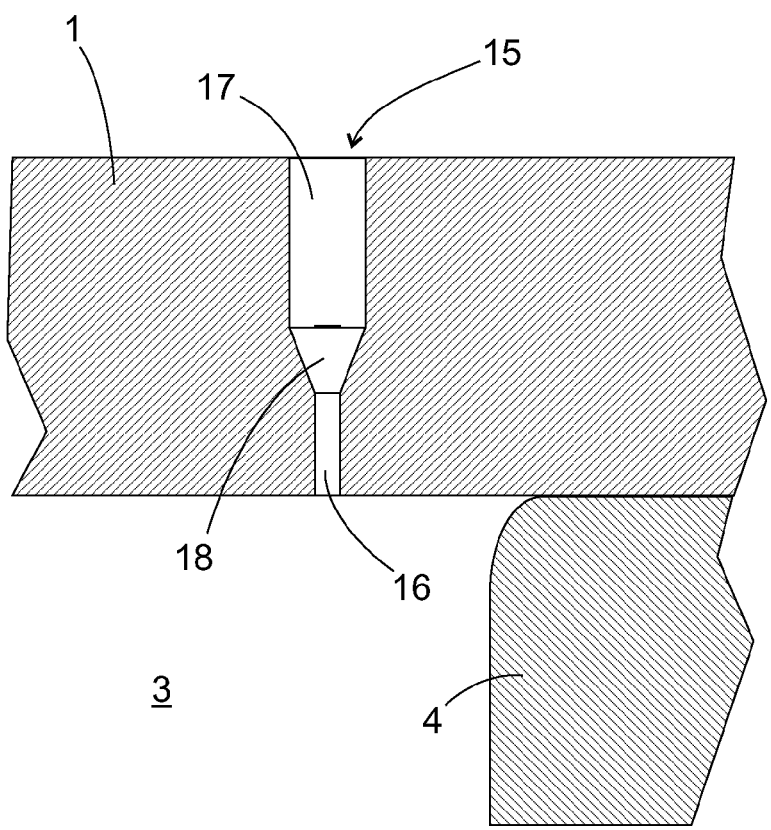
FIG. 2 an enlarged detail of the bearing from FIG. 1; and
c.

The holes 15 in the wall of the tubular section 1 each have the design shown in the enlarged section depicted in FIG. 2. A first, narrow section 16 of the hole extends outwards from the inner surface of the tubular section 1, a second, wider section 17 extends from the outer surface. The cross-sectional surfaces of the two sections 16, 17 are essentially constant over their entire length; between the two there is a conical third section 18 and this forms a continuous transition between the sections 16, 17.

The diameter of the first section 16 amounts to 20 to 30 μm, that of the second section 17 amounts to a maximum of 60 μm for a wall width of the tubular section 1 of 0.6 mm or maximum 100 μm for a wall width of the tubular section 1 of 1 mm.

The flow of gas through such a hole 15 depends for given diameters of the sections essentially on the length of the first section 16. The gas consumption of the aerostatic bearing, i.e. the amount of compressed gas needed to maintain the bearing effect and which can not be tapped off at the outlet connection piece 6 of the compressor in FIG. 1 can be set for a predetermined wall thickness of the tubular section 1 and a predetermined number and distribution of the holes 15 by a suitably defining the length of the first section 16.

Figure 3:
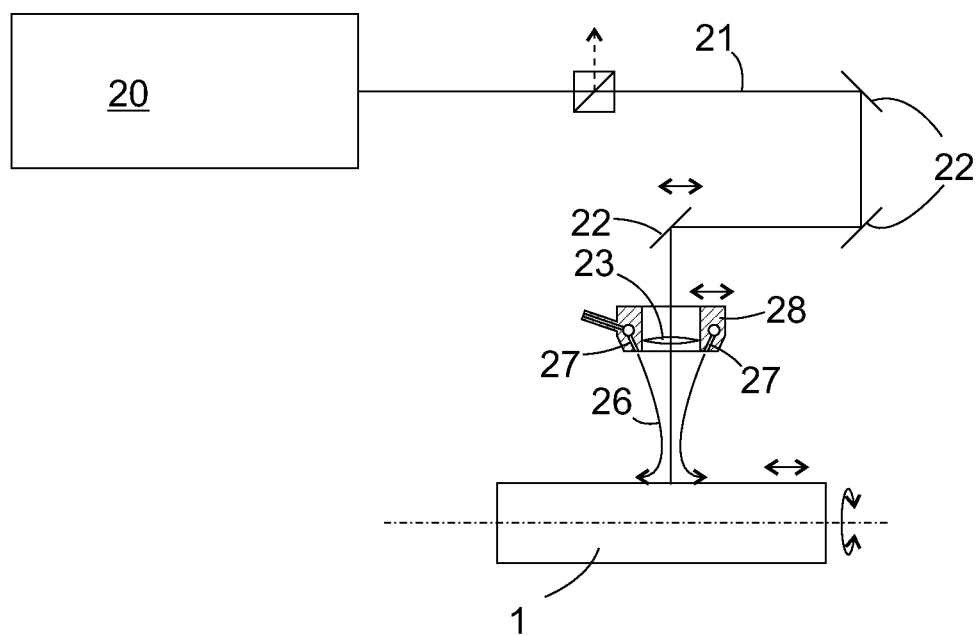
FIG. 3 a schematic diagram of an apparatus for creating the holes depicted in FIG. 2.

FIG. 3 shows a schematic diagram of an apparatus with which the holes 15 can be made in the tubular section 1. The apparatus comprises a Q-switched laser 20 which is able to deliver laser pulses with a pulse duration of 10 to 18 nanoseconds and an energy content of 3 Millijoules or more. Various types of solid state and gas lasers, for example Nd:YAG lasers or Excimer lasers, can be considered here which deliver an essentially diffraction-limited beam of high quality. The wavelength of the laser beam can lie in the near infrared, in the visible or in the ultraviolet spectral range, with short-wave laser types being preferred as a result of their longer Rayleigh zone at predetermined beam waists.

The beam 21 of the fixed laser 20 is guided by mirrors 22 and a lens 23 onto the outer side of the tubular section 1. To enable the power or pulsed energy of the laser beam 21 to be varied at the tubular section 1, a rotatable beam divider polarizer 24 is arranged at the output of the laser 20 in order to uncouple a proportion 25 which differs in accordance with orientation from the beam 21. Generally it would also be possible by varying the pump energy supplied to the laser 20 or with the aid of an absorption filter introduced into the beam path to vary the energy of the laser beam 21, however the use of the polarizer 24 has the advantage that thermal lens effects, which can influence the quality of the beam and thereby diameter and position of the beam waist, are largely avoided.

The distance between the lens 23 and the tubular section 1 is set so that it focuses the laser beam at the height of the inner surface of the tubular section 1. The focal width of the lens is selected so that the Rayleigh zone, i.e. the distance between the beam waist and the point at which the beam diameter has increased to the √2 times the beam waist, is at least as large as the wall thickness of the tubular section 1.

In order to make a hole in the tubular section 1 the polarizer 24 is first set to maximum transmission and a plurality of laser pulses are beamed onto the surface of the tubular section 1. The metal of the tubular section 1 liquefied and evaporated by the laser pulses is blown away from the drilled hole with the aid of a protective gas flow 26 which exits from openings 27 of a processing head 28 arranged in a ring around the lens 23 in parallel to the laser beam 21. The depth of the drilled hole created during such an operation, i.e. the section 17, is essentially proportional to the number of generated laser pulses.

Since the focus of the beam 21 lies at the height of the inner surface of the tubular section 1 strictly speaking the diameter of the focus point on the base of the hole reduces as the depth of the hole increases at which the power density of the beam is high enough to remove material. Since the Rayleigh zone is however is at least as long as the wall of the tubular section is wide, any change in the diameter which may result from this is small over the entire length of the section 17 compared to the diameter and is negligible.

After a desired number of laser pulses have been output at full power onto the tubular section 1 the polarizer is turned in order to reduce the energy content of the pulses to half or fewer. The energy of laser pulses output by the laser 20 during the adjustment of the polarizer 24 decreases continuously. As a result of the decreasing pulse energy the area surrounding the axis of the beam 21 narrows in which the power density of the beam 21 is sufficient to liquefy or to vaporize the metal of the tubular section 1. Thus the conical section 18 is produced while the polarizer 24 is being turned.

The narrower section 16 is obtained by pulses subsequently beamed with constant lower energy onto the tubular section 1. Since this section lies in the immediate vicinity of the focal point, the beam diameter only changes to a negligible extent over the length of the section 16 and accordingly section 16 has a good constant diameter.

In order to create all the holes 15 distributed in the axial direction and in the circumferential direction of the tubular section 1 one after the other, the tubular section is supported rotatably around its longitudinal axis and either the tubular section 1 or the processing head 28 is able to be moved in parallel to the longitudinal axis of the tubular section 1, as is indicated by arrows in each case in FIG. 3.

In principle greatly differing ratios between the diameters of the sections 16 and 17 can be realized by a corresponding selection of the ratio of the pulse energies. To make the flow resistance of section 17 small in relation to that of section 16, a diameter ratio of 2:1 is sufficient. Larger diameter ratios can be required with higher wall width in order to be able to ensure the removal of the melted metal from the drilled hole even at great depths of the latter. Whereas for example with a thickness of the tubular section 1 of 0.6 mm and a diameter of the section 16 of 20 to 30 μm, a diameter of section 17 of up to 60 μm is expedient, with a wall thickness of 1 mm for the same diameter of section 16 a diameter of section 17 of up to 100 μm will preferably be selected.

The invention claimed is:

1. An aerostatic bearing, comprising:
   a guide element including holes; and
   a body structured to move along a surface of the guide element, wherein the holes include a first section relative closer to the body, the first section including at least one part having a cross-sectional surface substantially constant over its entire length, the holes having a second section relatively farther away from the body, the second section having a cross-sectional surface which is larger than the cross-sectional surface of the first section,
   wherein the first section has a diameter of between about 10 and 40 μm, and
   wherein the second section has a diameter at least twice as large as the diameter of the first section.

2. The aerostatic bearing as claimed in claim 1, wherein the at least one part extends over the entire length of the first section.

3. The aerostatic bearing as claimed in claim 1, further comprising a third section disposed between the first section and the second section.

4. The aerostatic bearing as claimed in claim 3, wherein a cross-sectional surface of the third section increases continuously from the first section to the second section.

5. The aerostatic bearing as claimed in claim 1, wherein the guide element is structured to guide the body in a linear manner and completely surrounds the body in a section transverse to the direction of guidance.

6. The aerostatic bearing as claimed in claim 1, wherein the guide element includes a cylindrical tube.

7. The aerostatic bearing as claimed in claim 1, wherein the guide element has a width of at least 0.5 mm.

8. A linear compressor for compressing coolant with an aerostatic bearing, the linear compressor comprising:
   an aerostatic bearing, the aerostatic bearing comprising:
      a guide element including holes; and
      a body structured to move along a surface of the guide element, wherein the holes include a first section relatively closer to the body, the first section including at least one part having a cross-sectional surface substantially constant over its entire length, the holes having a second section relatively farther away from the body, the second section having a cross-sectional surface which is larger than the cross-sectional surface of the first section,
   wherein the first section has a diameter between about 10 and 40 mm, and wherein the second section has a diameter at least twice as large as the diameter of the first section.

9. The linear compressor as claimed in claim 8, wherein the body is structured as a piston and the guide element is structured as a cylinder wall of the linear compressor.

10. A refrigeration device, comprising:
    a linear compressor, the linear compressor including an aerostatic bearing, the aerostatic bearing comprising:
       a guide element including holes, the guide element having a thickness of between about 0.6 to 1 mm; and
       a body structured to move along a surface of the guide element, wherein the holes include a first section relatively closer to the body, the first section including at least one part having a cross-sectional surface substantially constant over its entire length, the holes having a second section relatively farther away from the body, the second section having a cross-sectional surface which is larger than the cross-sectional surface of the first section, wherein the first section has a diameter of between about 10 and 40 µm, wherein the second section has a diameter of between about 20 and 100 µm, wherein a length of the first section is variable depending on the thickness of the guide element so as to appropriately set a gas consumption of the bearing in accordance with a thickness of the guide element.

11. The linear compressor as claimed in claim 8, wherein the holes include a conical transition area between the first section and the second section, the conical transition area configured to produce a laminar gas flow therethrough.

12. A method for producing a hole in a guide element of an aerostatic bearing using a laser beam, the method comprising:

drilling the first section and a second section of the hole;

wherein, during drilling of the first section, at least one of a laser beam power and a laser beam pulse energy of the laser used for drilling is lower than during drilling of the second section, which has a larger cross-section than the first section;

wherein the aerostatic bearing includes a body structured to move along a surface of the guide element; and wherein the hole includes a first section relatively closer to the body, the first section including at least one part having a cross-sectional surface Substantially constant over its entire length, the holes having a second section relative farther away from the body, the second section having a cross-sectional surface which is larger than the cross-sectional surface of the first section, wherein the first section has a diameter of between about 10 and 40 µm, wherein the second section has a diameter at least twice as large as the diameter of the first section.

13. The method as claimed in claim 12, wherein the at least one of a laser beam power and laser beam pulse energy used for drilling the second section amounts to at least twice an amount than that used for drilling the first section.

14. The method as claimed in claim 12, wherein the first section and the second section are drilled from a same side of the guide element.

15. The method as claimed in claim 12, wherein the second section is drilled before the first section.

16. The method as claimed in claim 12, wherein the laser beam is focused on a surface of the guide element facing away from the laser beam.

17. The method as claimed in claim 12, wherein the at least one of a laser beam power and a laser beam pulse energy is gradually reduced after the drilling of the second section.

18. The method as claimed in claim 12, further comprising directing a gas flow from a direction of a beam of the laser against a surface of the element during the drilling.

* * * * *

UNITED STATES PATENT AND TRADEMARK OFFICE
CERTIFICATE OF CORRECTION

PATENT NO.        : 8,714,075 B2                                                           Page 1 of 1
APPLICATION NO.   : 12/742693
DATED             : May 6, 2014
INVENTOR(S)       : Giacchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Signed and Sealed this

Twenty-ninth Day of September, 2015

Michelle K. Lee
*Director of the United States Patent and Trademark Office*